United States Patent
Koehler et al.

(10) Patent No.: US 12,351,177 B2
(45) Date of Patent: Jul. 8, 2025

(54) SYSTEMS AND METHODS FOR DETERMINING VEHICLE CONTROL BASED ON ESTIMATED REALIZATION DELAY

(71) Applicant: Toyota Research Institute, Inc., Los Altos, CA (US)

(72) Inventors: Sarah Koehler, San Jose, CA (US); Matthew Brown, Palo Alto, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 217 days.

(21) Appl. No.: 17/731,969

(22) Filed: Apr. 28, 2022

(65) Prior Publication Data

US 2023/0347894 A1 Nov. 2, 2023

(51) Int. Cl.
*B60W 30/18* (2012.01)
*B60W 50/14* (2020.01)
*B62D 15/02* (2006.01)

(52) U.S. Cl.
CPC ...... *B60W 30/18109* (2013.01); *B60W 50/14* (2013.01); *B62D 15/021* (2013.01); *B60W 2050/146* (2013.01); *B60W 2510/18* (2013.01); *B60W 2510/20* (2013.01)

(58) Field of Classification Search
CPC ....... B60W 2050/146; B60W 2510/18; B60W 2510/20; B60W 30/18109; B60W 50/14; B62D 15/021; B62D 15/025
See application file for complete search history.

(56) References Cited

U.S. PATENT DOCUMENTS

| | | | |
|---|---|---|---|
| 8,190,330 B2* | 5/2012 | Lee | B62D 1/28 701/44 |
| 10,227,075 B2* | 3/2019 | Zhu | B60W 30/16 |
| 10,683,012 B2* | 6/2020 | Zhu | B60W 30/10 |
| 11,124,202 B1* | 9/2021 | Stark | G05D 1/0022 |
| 11,167,770 B2* | 11/2021 | Wang | B60W 50/035 |
| 11,279,372 B2* | 3/2022 | Bobier-Tiu | B60W 50/0097 |
| 2009/0248233 A1* | 10/2009 | Yamada | F16H 61/12 701/31.4 |
| 2011/0238254 A1* | 9/2011 | Mulder | B60W 40/02 701/1 |
| 2017/0259849 A1* | 9/2017 | Fukukawa | B62D 15/021 |
| 2017/0357262 A1* | 12/2017 | Dix | G05D 1/0231 |
| 2018/0086351 A1* | 3/2018 | Zhu | B60W 30/16 |
| 2018/0088576 A1* | 3/2018 | Kong | G05D 1/0212 |
| 2018/0297578 A1* | 10/2018 | Park | B60K 6/485 |
| 2020/0401154 A1* | 12/2020 | Xiong | B60K 31/04 |

(Continued)

*Primary Examiner* — Carl C Staubach
(74) *Attorney, Agent, or Firm* — Christopher G. Darrow; Darrow Mustafa PC

(57) ABSTRACT

Systems, methods, and other embodiments described herein relate to determining a type and an issue time of a vehicle control command based on an estimated realization delay. In one embodiment, a method includes identifying a first realization delay associated with a first control command and identifying a second realization delay associated with a second control command. The second control command is issued after the first control command is issued. The method includes issuing the first control command at an issue time that is based on the first realization delay and the second realization delay, and realizing the first control command on a vehicle.

17 Claims, 4 Drawing Sheets

(56) References Cited

U.S. PATENT DOCUMENTS

| | | | |
|---|---|---|---|
| 2021/0253118 A1* | 8/2021 | Wang | B60W 50/06 |
| 2021/0261160 A1* | 8/2021 | Wang | B60W 50/06 |
| 2021/0284136 A1* | 9/2021 | Sugihira | B60W 10/20 |
| 2021/0339735 A1* | 11/2021 | Tsukano | B60W 30/18145 |
| 2022/0017103 A1* | 1/2022 | Koehler | G05B 13/047 |
| 2023/0192181 A1* | 6/2023 | Aoki | B62D 15/025 |
| | | | 701/41 |

* cited by examiner

SYSTEMS AND METHODS FOR DETERMINING VEHICLE CONTROL BASED ON ESTIMATED REALIZATION DELAY

TECHNICAL FIELD

The subject matter described herein relates in general to systems and methods for determining a type and an issue time of a vehicle control command based on an estimated realization delay.

BACKGROUND

Modern vehicles include various degrees of advanced driver-assistance systems (ADAS). Such control systems may react to a driving situation by issuing a driving instruction in response to the driving situation. However, the response time of the vehicle system carrying out the driving instruction may include a delay due to communications transmission time and actuator response time. As such, the vehicle system carrying out the driving instruction after the delay may lead to an ineffective or even dangerous result.

SUMMARY

In one embodiment, a system for determining a type and an issue time of a vehicle control command based on an estimated realization delay is disclosed. The system includes a processor and a memory in communication with the processor. The memory stores a control module including machine-readable instructions that, when executed by the processor, cause the processor to identify a first realization delay associated with a first control command, identify a second realization delay associated with a second control command, issue the first control command at an issue time that is based on the first realization delay and the second realization delay, and realize the first control command on a vehicle. The second control command is issued after the first control command is issued.

In another embodiment, a method for determining a type and an issue time of a vehicle control command based on an estimated realization delay is disclosed. The method includes identifying a first realization delay associated with a first control command, identifying a second realization delay associated with a second control command, issuing the first control command at an issue time that is based on the first realization delay and the second realization delay, and realizing the first control command on a vehicle. The second control command is issued after the first control command is issued.

In another embodiment, a non-transitory computer-readable medium for determining a type and an issue time of a vehicle control command based on an estimated realization delay and including instructions that when executed by a processor cause the processor to perform one or more functions, is disclosed. The instructions include instructions to identify a first realization delay associated with a first control command, identify a second realization delay associated with a second control command, issue the first control command at an issue time that is based on the first realization delay and the second realization delay, and realize the first control command on a vehicle. The second control command is issued after the first control command is issued.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
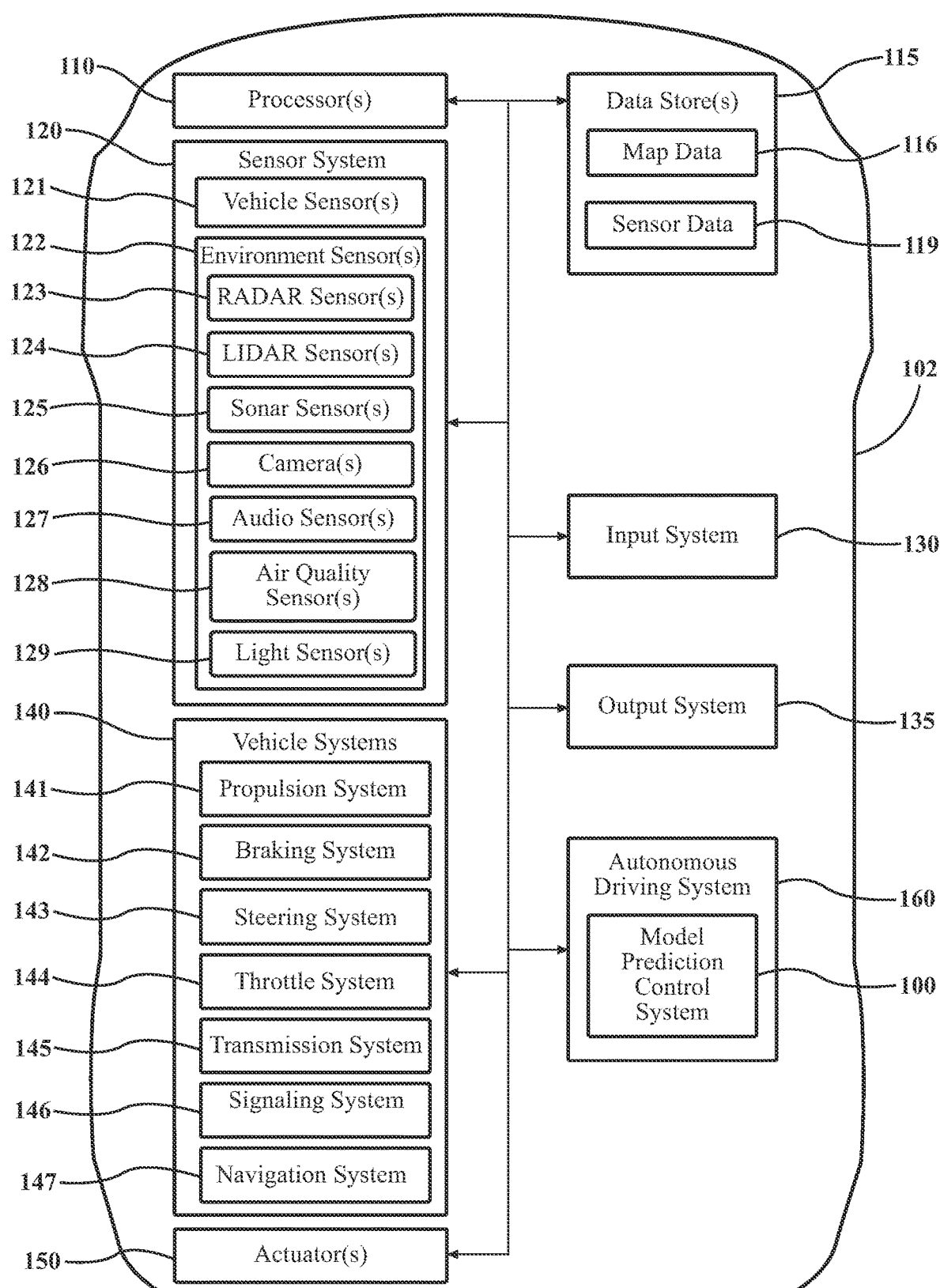
FIG. 1 illustrates one embodiment of a vehicle within which systems and methods disclosed herein may be implemented.

Systems, methods, and other embodiments associated with determining a type and an issue time of a vehicle control command based on an estimated realization delay are disclosed.

Vehicle systems may communicate with each other to operate the vehicle. As an example, a control vehicle system such as an autonomous driving system may issue a command to a vehicle system such as a steering system, a braking system, or a throttle system. However, there is a realization delay which is a time difference between when the control vehicle system issues the command and when the related vehicle system begins to act on the issued command. The realization delay may be caused by communication or transmission delays, i.e., the command travelling through the communication infrastructure. Additionally and/or alternatively, the realization delay may be caused by the physical and/or mechanical limitations of the actuators associated with the related vehicle system. As such and as example, when the autonomous driving system issues a steering command at $t_0$, the steering wheel may begin to rotate in response to the steering command at $t_0$+realization delay. In a case where the autonomous driving system is unaware of and does not account for the realization delay, the vehicle may act in accordance with the command at an inopportune time.

As another example, the autonomous driving system may issue a series of command without accounting for the realization delays which may lead to the commands not being executed and completed within an anticipated time period that did not include the realization delays.

As another example, the autonomous driving system may issue a series of commands without accounting for the realization delays which may result in the vehicle systems responding to the commands in an order that was not intended by the autonomous driving system.

Current technologies may utilize a constant realization delay and may adapt the control vehicle system such that the control vehicle system issues a control command, anticipating that the command will be executed by the related vehicle system after the constant realization delay period has expired. As an example, the control vehicle system may determine the issue time of a control based on when the control vehicle system intends for the related vehicle system to begin to act and the constant realization delay. However, the realization delay is not constant between vehicle systems and as such, vehicle systems may begin to act at an unintended time when the realization delay varies from the constant realization delay.

It is worth noting that the realization delay may vary based on the types of commands, vehicle conditions, and environment conditions. As an example, the realization delay for an acceleration command accelerating from 20 mph to 40 mph may differ from the realization delay for an acceleration command accelerating from 10 mph to 20 mph. As another example, the realization delay for a steering command rotating counter-clockwise from 10 degrees to 20 degrees may differ from the realization delay for a steering command rotating clockwise from 10 degrees to 20 degrees.

The embodiments disclose herein present various advantages over current technologies. First, the embodiments can provide a more accurate instruction, determining the type of command to issue and time to issue the command such that the related vehicle system begins performing the command at a time intended by the control vehicle system. Second, the embodiments can provide cohesive series of commands as the characteristics of the earlier commands in a series of commands have been determined based on the realization delays and characteristics of later commands in the series of commands. Third, the embodiments can utilize a dynamic model of the realization delay (i.e., a model of how the realization delay varies over time and based on varying inputs) to predict current and future realization delays. Fourth, the embodiments can improve the vehicle controller tracking performance based on the predicted realization delay(s).

An autonomous driving system in a vehicle may generate a series of commands to be carried out by various vehicle systems such as the steering system, the braking system, and the throttle system. The vehicle may include a model prediction control system that uses a dynamic model to predict the realization delay between the autonomous driving system issuing a command and the related system performing the command. The model prediction model may predict the realization delays for current and future commands using a dynamic model that is a function of various factors such as communication delay, computation load and delay, actuation delay, current vehicle conditions (or state), vehicle control inputs, environment conditions, and estimated realization delays. The system may receive the various factors from sensors and other measurement devices within the vehicle. Additionally and/or alternatively, the system may receive the various factors from other vehicles or other external sources.

The autonomous driving system may receive the realization delays associated with the commands in the series of commands. As an example, the autonomous driving system may generate a first control command to rotate the steering wheel 30 degrees clockwise and a second control command to accelerate from 20 mph to 30 mph. The autonomous driving system may request and receive a first realization delay associated with the first control command and a second realization delay associated with the second control command from the model prediction control system.

The autonomous driving system may adjust the issue times of the first and second commands, the magnitude of the command (e.g., changing the first command from steering 30 degrees clockwise to steering 20 degrees clockwise), or the type of command (e.g., changing the second command from accelerating from 20 mph to 30 mph to braking). More generally, the autonomous driving system may adjust the issue times, the magnitudes, or the types of one or more commands in the series of commands based on the realization delays of one or more commands in the series of commands.

Referring to FIG. 1, a block diagram of a vehicle 102 incorporating a model prediction control system 100 is illustrated. The vehicle 102 includes various elements. It will be understood that in various embodiments, it may not be necessary for the vehicle 102 to have all of the elements shown in FIG. 1. The vehicle 102 can have any combination of the various elements shown in FIG. 1. Further, the vehicle 102 can have additional elements to those shown in FIG. 1. In some arrangements, the vehicle 102 may be implemented without one or more of the elements shown in FIG. 1. While the various elements are shown as being located within the vehicle 102 in FIG. 1, it will be understood that one or more of these elements can be located external to the vehicle 102. Further, the elements shown may be physically separated by large distances.

Some of the possible elements of the vehicle 102 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 102 includes a model prediction control system 100 that is implemented to perform methods and other functions as disclosed herein relating to determining a type and an issue time of a vehicle control command based on an estimated realization delay. As an example, the model prediction control system 100, in various embodiments, may be implemented partially within the vehicle 102 and may further exchange communications with additional aspects of the model prediction control system 100 that are remote from the vehicle 102 in support of the disclosed functions. Thus, while FIG. 2 generally illustrates the model prediction control system 100 as being self-contained, in various embodiments, the model prediction control system 100 may be implemented within multiple separate devices some of which may be remote from the vehicle 102.

Figure 2:
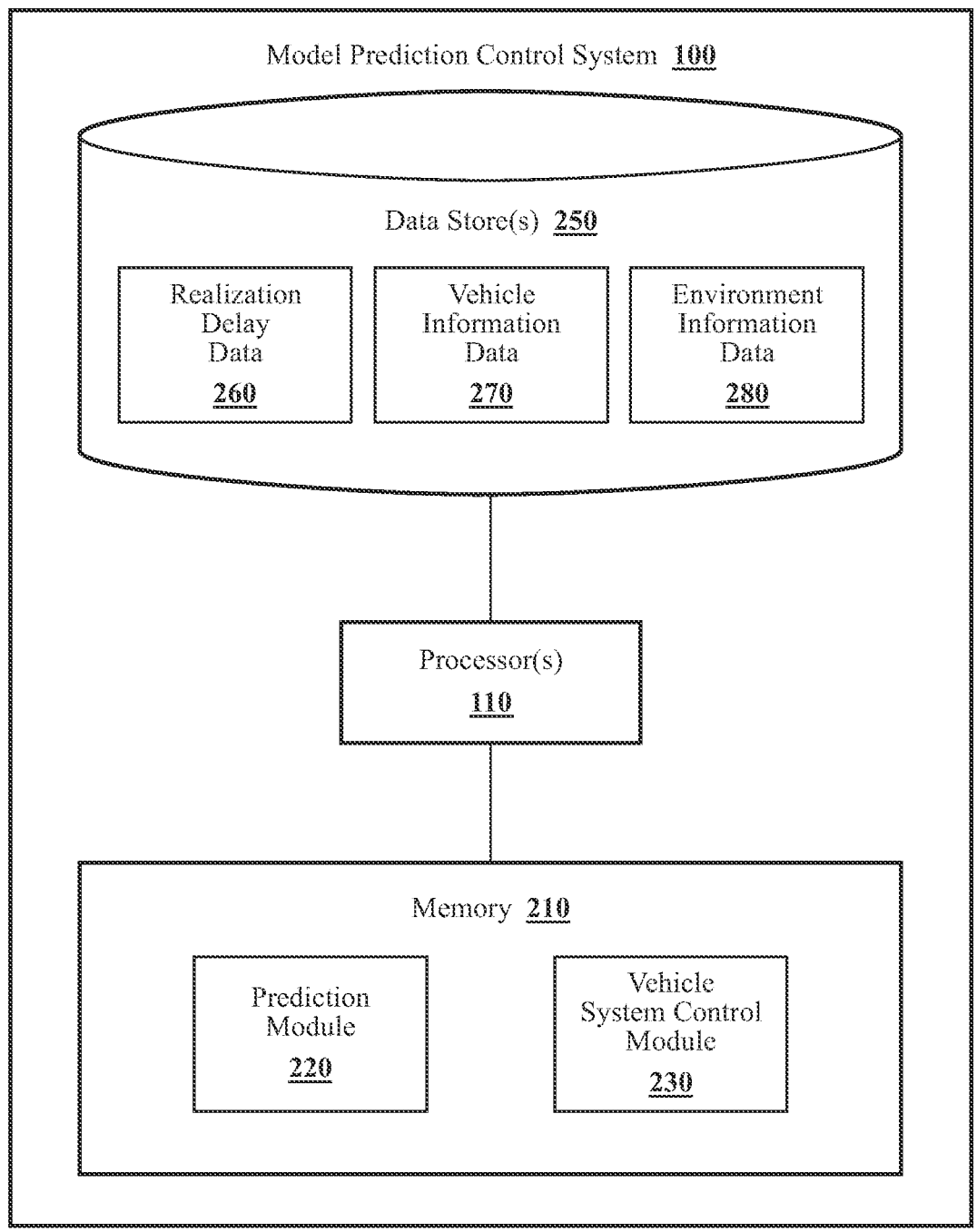
FIG. 2 illustrates one embodiment of the model prediction control system.

Referring to FIG. 2, a more detailed block diagram of the model prediction control system 100 is shown. The model prediction control system 100 may include a processor(s) 110. Accordingly, the processor(s) 110 may be a part of the model prediction control system 100, or the model prediction control system 100 may access the processor(s) 110 through a data bus or another communication pathway. In one or more embodiments, the processor(s) 110 is an application-specific integrated circuit that may be configured to implement functions associated with a prediction module 220, and/or a vehicle system control module 230. More generally, in one or more aspects, the processor(s) 110 is an electronic processor, such as a microprocessor that can perform various functions as described herein when loading the modules 220-230 and executing encoded functions associated therewith.

The model prediction control system 100 may include a memory 210 that stores the prediction module 220 and the vehicle system control module 230. The memory 210 may be a random-access memory (RAM), read-only memory (ROM), a hard disk drive, a flash memory, or other suitable memory for storing the modules 220-230. The modules 220-230 are, for example, machine-readable instructions that, when executed by the processor(s) 110, cause the processor(s) 110 to perform the various functions disclosed herein. While, in one or more embodiments, the modules 220-230 are instructions embodied in the memory 210, in further aspects, the modules 220-230 include hardware, such as processing components (e.g., controllers), circuits, etc. for independently performing one or more of the noted functions.

The model prediction control system 100 may include a data store(s) 250 for storing one or more types of data. Accordingly, the data store(s) 250 may be a part of the model prediction control system 100, or the model prediction control system 100 may access the data store(s) 250 through a data bus or another communication pathway. The data store(s) 250 is, in one embodiment, an electronically based data structure for storing information. In at least one approach, the data store 250 is a database that is stored in the memory 210 or another suitable medium, and that is configured with routines that can be executed by the processor (s) 110 for analyzing stored data, providing stored data, organizing stored data, and so on. In either case, in one embodiment, the data store 250 stores data used by the modules 220-230 in executing various functions. In one embodiment, the data store 250 may be able to store realization delay data 260, vehicle information data 270, environment information data 280, and/or other information that is used by the modules 220-230.

The data store(s) 250 may include volatile and/or non-volatile memory. Examples of suitable data stores 250 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 250 may be a component of the processor(s) 110, or the data store(s) 250 may be operatively connected to the processor (s) 110 for use thereby. The term "operatively connected" or "in communication with" as used throughout this description, can include direct or indirect connections, including connections without direct physical contact.

In one or more arrangements, the data store(s) 250 can include realization delay data 260. The realization delay data 260 can include a recorded time difference between when a control command is issued and when the control command is realized on the vehicle. The recorded time difference may be based on system monitors and/or vehicle sensors. The realization delay data 260 may include the type and parameters of the control command. The type of control command may be a steering command, a braking command, or a throttle command. For a steering command, the parameters of the steering command may include a steering rotation rate, steering angle, and the direction of rotation (e.g., clockwise or counter-clockwise). For a braking command, the parameters of the braking command may include a braking speed and a degree of braking. For a throttle command, the parameters of the throttle command may include an acceleration rate and a deceleration rate.

The realization delay data 260 may include the time difference between when the autonomous driving system 160 issues a command and when the related vehicle system begins to act in response to the command. As an example, the realization delay data 260 may include the time difference between when the autonomous driving system 160 issues a braking command and when the braking system 142 begins the braking process. The realization delay data 260 may further include the vehicle conditions and environment conditions at the time when the autonomous driving system 160 issued the braking command. The realization delay data 260 may include vehicle conditions such as the rotation states (e.g., yaw, pitch, roll), the velocity, vehicle weight, and weight distribution. The realization delay data 260 may include environment conditions such the weather, the location of the vehicle 102, the slope of the path, and the time of day.

The realization delay data 260 may include the time difference between the autonomous driving system 160 issues a steering command and when the steering system 143 begins to rotate the steering wheel. The realization delay data 260 may include the angle of the steering wheel at the time when the autonomous driving system 160 issued the steering command. The realization delay data 260 may include the time difference between the autonomous driving system 160 issues a throttle command and when the throttle system 144 begins the acceleration or deceleration process. The realization delay data 260 may include the velocity and acceleration of the vehicle 102 at the time when the autonomous driving system 160 issued the throttle command.

The realization delay data 260 may include a recorded time difference between when a control command is issued and when the control command is realized on other vehicles, which may originate from sources such as an external database or via V2V (vehicle-to-vehicle) communication.

The realization delay data 260 may include time difference estimates between when the autonomous driving system 160 issues a command and when the related vehicle system 140 begins to act in response to the command. The time difference estimates may be based on the recorded time differences, vehicle conditions, and the environment conditions, and may be determined using any suitable process or algorithm.

In one or more arrangements, the data store(s) 250 can include vehicle information data 270. The vehicle information data 270 can include information about the vehicle 102 at a present time and/or at a future time. The information may include vehicle conditions such as the rotation states (e.g., yaw, pitch, roll), the velocity, vehicle weight, and weight distribution at the present time and/or the future time.

In one or more arrangements, the data store(s) 250 can include environment information data 280. The environment information data 280 may include information about the environment surrounding the vehicle 102 such as the location and condition of the path that the vehicle 102 is travelling on. The condition of the path can include information about the physical condition of the path such as the presence of potholes, road debris, vegetation, occlusions and/or the presence of road delineators such as lane markers, road edge markers, traffic signs, traffic lights, and communicative roadside units.

Additionally and/or alternatively, the environment information data 280 can include conditions in the environment such as a weather condition, a road condition, and/or a timestamp. A weather condition may include, as an example, presence of precipitation such as snow, rain, and/or hail. The weather condition may further include impacts of weather such as fog levels, fallen snow levels (i.e., the amount of snow on the ground), and/or flooding. The realization delay data 260, the vehicle information data 270, and the environment information data 280 may be updated periodically and/or on-demand. The realization delay data 260, the vehicle information data 270, and the environment information data 280 may be digital data that describe information used by the model prediction control system 100 to control a vehicle system 140.

In one embodiment, the prediction module 220 may include machine-readable instructions that, when executed by the processor(s) 110, cause the processor(s) 110 to identify a first realization delay associated with a first control command and identify a second realization delay associated with a second control command. The second control command is issued after the first control command is issued. A realization delay refers to a time difference between when a control command is issued and when the control command is realized on the vehicle 102. The control command may be issued by a vehicle control system such as the autonomous driving system 160, and the control command may be realized on the vehicle 102 by a vehicle system 140 such as the steering system 143, the braking system 142, and/or the throttle system 144. As such, the first realization delay indicates a first time difference estimate between when the first control command is issued and when the first control command is realized on the vehicle 102, and the second realization delay indicates a second time difference estimate between when the second control command is issued and when the second control command is realized on the vehicle 102.

As an example, the autonomous driving system 160 may issue the first control command and the second control command. The first control command may be one of a steering command, a braking command, or a throttle command and as such, the first control command may be realized by one of a steering system 143, a braking system 142, or a throttle system 144 respectively. Similarly, the second control command may be one of the steering command, the braking command, or the throttle command, and the second control command may be realized by one of the steering system 143, the braking system 142, or the throttle system 144.

As an example, the prediction module 220 may identify the first realization delay associated with the first control command by identifying the first control command, the current and future vehicle conditions, and the current and future environment conditions. The prediction module 220 may receive the first control command from the autonomous driving system 160 and/or the vehicle system control module 230. The prediction module 220 may receive the current and future vehicle conditions from the vehicle information data 270. The prediction module 220 may receive the current and future environment conditions from the environment information data 280.

The prediction module 220 may request and receive the first realization delay based on the first control command, the vehicle conditions, and the environment conditions from the realization delay data 260. Additionally and/or alternatively, the prediction module 220 may utilize any suitable algorithm and/or machine learning process to determine the first realization delay. As an example, the prediction module 220 may determine the first realization delay using an online dynamic model that is a function of the first control command, current and future vehicle conditions, current and future environment conditions, and/or previous realization delays in the vehicle 102. Additionally, the prediction module 220 may determine the first realization delay as a function of various inputs such as communication delay, computational load, actuation delay, algorithm computation, and a current estimated realization delay. Upon determining the first realization delay, the prediction module 220 may update the realization delay data 260 to include the determined first realization delay.

As an example, the prediction module 220 may identify the second realization delay associated with the second control command by identifying the second control command, the current and future vehicle conditions, and the current and future environment conditions. The prediction module 220 may receive the second control command from the autonomous driving system 160 and/or the vehicle system control module 230. As previously mentioned, the prediction module 220 may receive the current and future vehicle conditions from the vehicle information data 270 and the current and future environment conditions from the environment information data 280.

The prediction module 220 may request and receive the second realization delay based on the second control command, the vehicle conditions, and the environment conditions from the realization delay data 260. Additionally and/or alternatively, the prediction module 220 may utilize any suitable algorithm and/or machine learning process to determine the second realization delay. As an example, the prediction module 220 may determine the second realization delay using an online dynamic model that is a function of the second control command, current and future vehicle conditions, current and future environment conditions, and/or previous realization delays in the vehicle 102. Additionally, the prediction module 220 may determine the second realization delay as a function of various inputs such as communication delay, computational load, actuation delay, algorithm computation, and a current estimated realization delay. Upon determining the second realization delay, the prediction module 220 may update the realization delay data to include the determined second realization delay.

In one embodiment, the vehicle system control module 230 may include instructions that, when executed by the processor(s) 110, cause the processor(s) 110 to issue the first control command at an issue time that is based on the first realization delay and the second realization delay. The first control command includes a type of command and at least one parameter. The vehicle system control module 230 may determine the type of command and/or the parameter(s) of the command based on the first realization delay. Additionally and/or alternatively, the vehicle system control module 230 may determine the type of command or the parameter(s) based on the first realization delay, the second realization delay, and/or the second control command.

As an example, the autonomous driving system 160 may determine a series of control commands to be issued based on the vehicle conditions, the environment conditions, and the realization delays of the control command(s) in the series. The autonomous driving system 160 may determine the issue times for the series of control commands based on the vehicle conditions, the environment conditions, and the realization delays of the control command(s) in the series. The series of control commands may include the first control command and the second control command.

The autonomous driving system 160 may determine the series of commands and the issue times using any suitable algorithm or planning process such as a route planning system. As an example, the autonomous driving system 160 may determine the series of commands and the issue times based on a machine learning process or an algorithm that is a function of the vehicle conditions, the environment conditions, the realization delay estimates for the control command(s) in the series. In such an example, the autonomous driving system 160 may request and receive realization delay estimates (or predictions) for the control commands in the series of control commands from the prediction module 220.

As another example, the autonomous driving system 160 may determine a series of control commands to be issued based on the vehicle conditions and the environment conditions. The vehicle system control module 230 may receive the series of commands. The vehicle system control module 230 may request and receive realization delay estimates (or predictions) for the control commands in the series of control commands from the prediction module 220. As an example, based on the first realization delay associated with the first control command and the second realization delay associated with the second control command, the vehicle system control module 230 may adjust the type of command and/or the parameters of the command.

As an example, so as to make a turn on a curved path, the first control command may be a 10 degree turn of the steering wheel and the second control command may be a 15 degree turn of the steering wheel. However, the vehicle system control module 230 may determine that the first realization delay and the second realization delay may be significant such that the vehicle 102 may veer off the curved path if the vehicle 102 steers based on the first and second control commands. As such the vehicle system control module 230 may change a parameter of the first control command from a 10 degree turn to a 15 degree turn and may change the type of command for the second control command from a steering command to a braking command. Additionally, the vehicle system control module 230 may determine when the first control command and second control command are to be issued. The vehicle system control module 230 may determine the type of command, the parameter(s) of the command, and the issue time using any suitable algorithm, machine learning process, and/or route planning process. As such, the vehicle system control module 230 may determine the first control command, a first issue time for the first command, a second control command, and a second issue time for the second issue time.

In one embodiment, the vehicle system control module 230 may include instructions that, when executed by the processor 110, cause the processor 110 to realize the first control command on a vehicle. As an example, the vehicle system control module 230 may transmit the first control command at the first issue time to the vehicle system 140 associated with the first control command, and transmit the second control command at the second issue time to the vehicle system 140 associated with the second control command. As such, the vehicle system 140 associated with the first control command may begin to perform a time period based on the first realization delay after the first issue time. Similarly, the vehicle system 140 associated with the second control command may begin to perform a time period based on the second realization delay after the second issue time.

Figure 3:
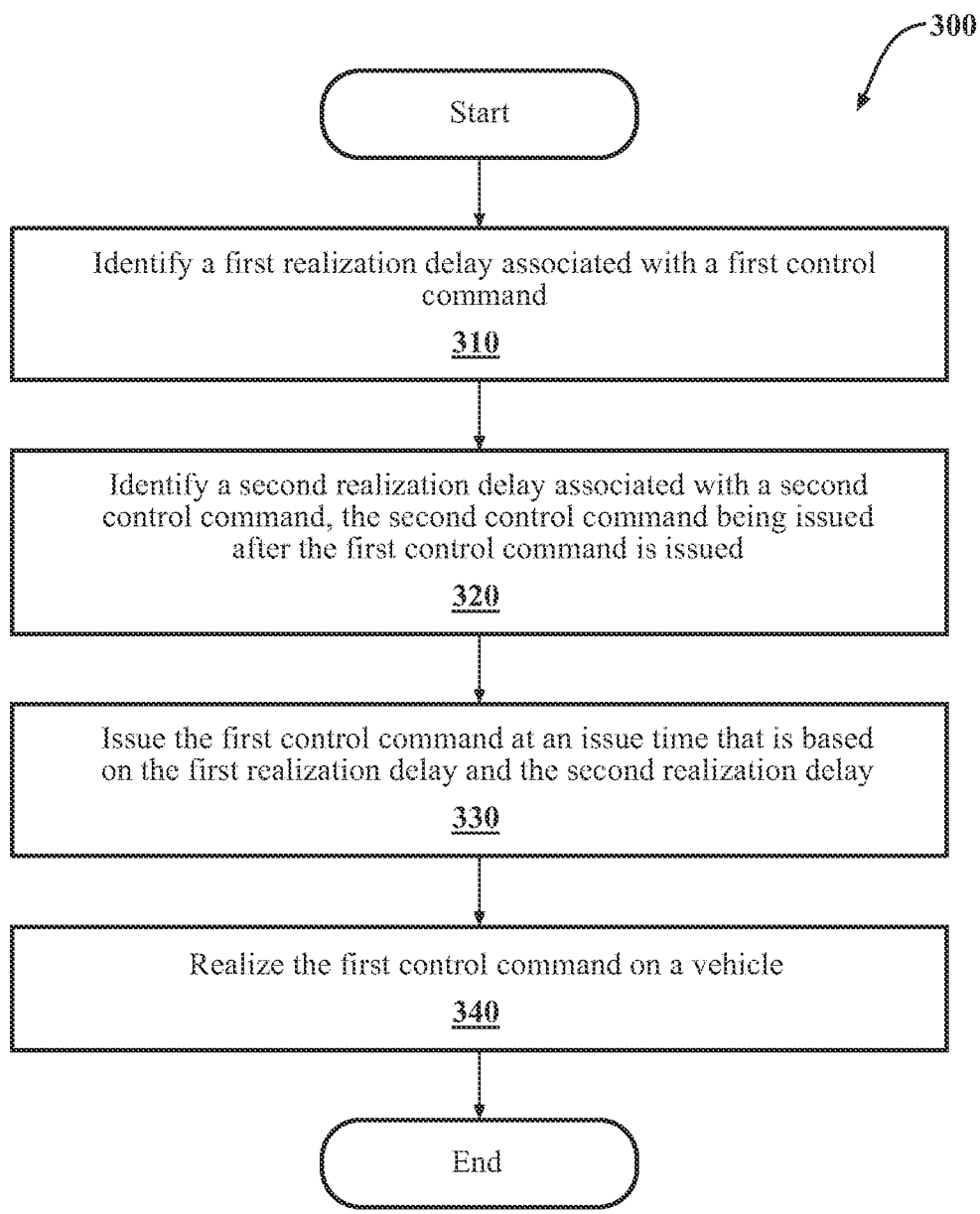
FIG. 3 illustrates a method for determining a type and an issue time of a vehicle control command based on an estimated realization delay.

FIG. 3 illustrates a method 300 for determining a type and an issue time of a vehicle control command based on an estimated realization delay. The method 300 will be described from the viewpoint of the model prediction control system 100 of FIGS. 1 to 2. However, the method 300 may be adapted to be executed in any one of several different situations and not necessarily by the model prediction control system 100 of FIGS. 1 to 2.

At step 310, the prediction module 220 may cause the processor 110 to identify a first realization delay associated with a first control command, as described above.

At step 320, the prediction module 220 may cause the processor 110 to identify a second realization delay associated with a second control command as previously described. The second control command is issued after the first control command is issued.

At step 330, the vehicle system control module 230 may cause the processor 110 to issue the first control command at an issue time that is based on the first realization delay and the second realization delay.

At step 340, the vehicle system control module 230 may cause the processor 110 to realize the first control command on a vehicle as disclosed above.

Figure 4:
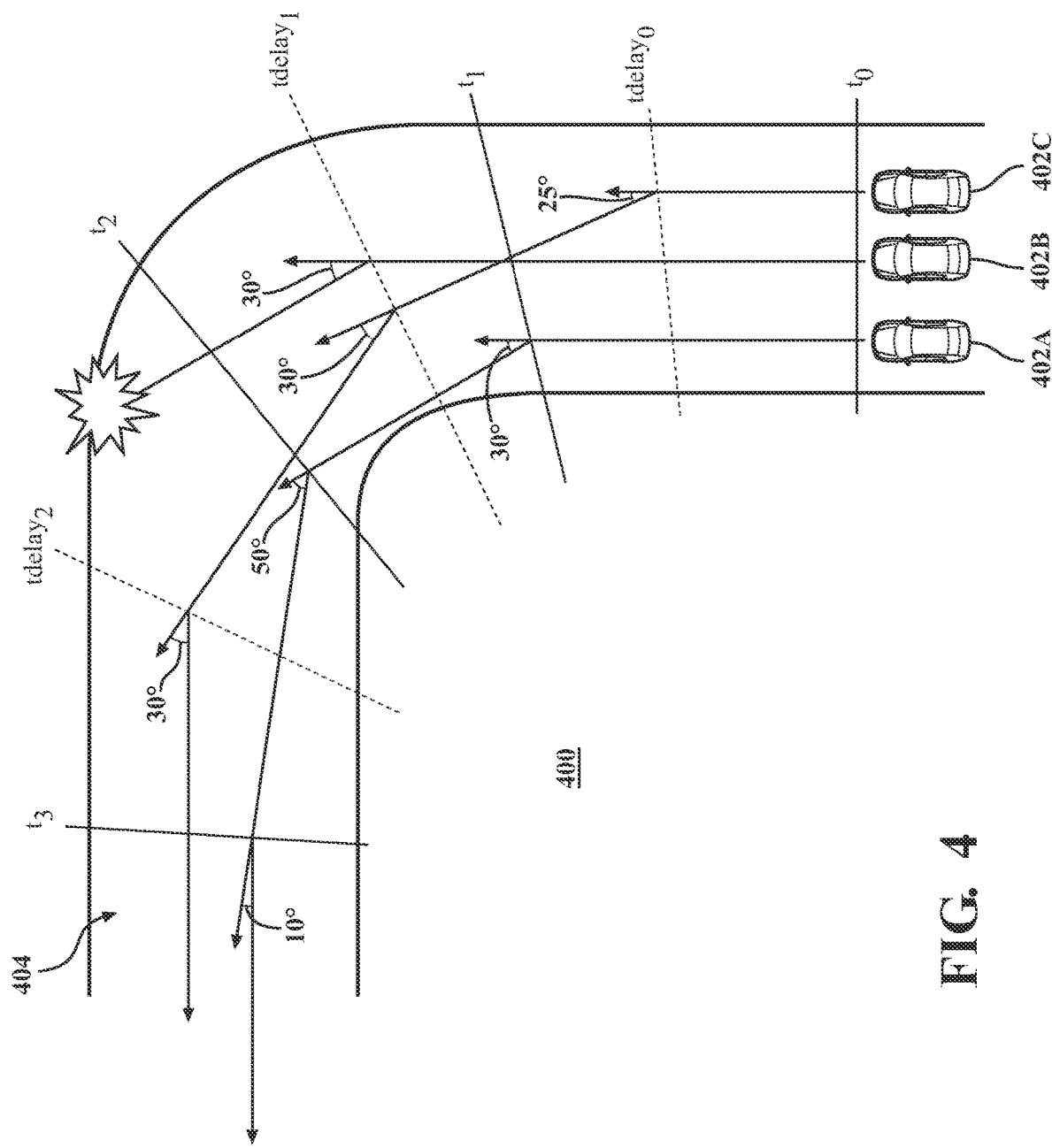
FIG. 4 illustrates an example method of a model prediction control scenario.

A non-limiting example of the operation of the model prediction control system 100 and/or one or more of the methods will now be described in relation to FIG. 4. FIG. 4 shows an example of a model prediction control scenario 400.

FIG. 4 shows three vehicles 402A, 402B, 402C approaching a curved path 404. The first vehicle 402A is a fictional vehicle that responds instantaneously to control commands from the autonomous driving system 160. The second vehicle 402B is a vehicle with an autonomous driving system 160 that does not generate control commands based on the realization delays associated with the control commands. The third vehicle 402C is a vehicle with an autonomous driving system 160 that generates control commands based on the realization delays associated with the control commands.

For the first vehicle 402A, the autonomous driving system 160 issues a first steering command of 30 degrees at a first issue time $t_1$, a second steering command of 50 degrees at a second issue time $t_2$, and a third steering command of 10 degrees at a third issue time $t_3$. As the first vehicle 402 is fictional and capable of responding instantaneously, the first vehicle 402A steers accordingly at first, second, and third issue times $t_1$, $t_2$, $t_3$, and successfully travels through the curved path 404.

Similarly, for the second vehicle 402B, the autonomous driving system 160 issues a first steering command of 30 degrees at a first issue time $t_1$, a second steering command of 50 degrees at a second issue time $t_2$, and a third steering command of 10 degrees at a third issue time $t_3$. The first steering command is realized and the second vehicle steers 30 degrees counter-clockwise after a first realization delay $tdelay_1$, causing the second vehicle 402B to veer off the curved path 404.

For the third vehicle 402C, the autonomous driving system 160 may initially determine a series of steering commands similar to the first and second vehicles 402A, 402B. However, when the autonomous driving system 160 and/or the vehicle system control module 230 determine the realization delays associated with the steering commands, the autonomous driving system 160 and/or the vehicle system control module 230 may adjust the parameters of the steering commands as well as the issue times so as to prevent the third vehicle 402C from veering off the curved path 404. As such and in this example, the autonomous driving system 160 and/or vehicle system control module 230 may issue a first steering command of 25 degrees at an earlier issue time to, a second steering command of 30 degrees at the first issue time $t_1$, and a third steering command of 35 degrees at the second issue time $t_3$. The third vehicle steers 25 degrees counter-clockwise at $tdelay_0$, steers 30 degrees counter-clockwise at $tdelay_1$, and steers 35 degrees counter-clockwise at $tdelay_2$, and successfully travels through the curved path 404.

FIG. 1 will now be discussed in full detail as an example environment within which the system and methods disclosed herein may operate. In one or more embodiments, the vehicle 102 is an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 110. In one or more arrangements, the processor(s) 110 can be a main processor of the vehicle 102. For instance, the processor(s) 110 can be an electronic control unit (ECU). The vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 260-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

The one or more data stores 115 can include sensor data 119. In this context, "sensor data" means any information about the sensors that the vehicle 102 is equipped with, including the capabilities and other information about such sensors. As will be explained below, the vehicle 102 can include the sensor system 120. The sensor data 119 can relate to one or more sensors of the sensor system 120. As an example, in one or more arrangements, the sensor data 119 can include information on one or more vehicle sensors 121 and/or environment sensors 122 of the sensor system 120.

In some instances, at least a portion of the map data 116 and/or the sensor data 119 can be located in one or more data stores 115 located onboard the vehicle 102. Alternatively, or in addition, at least a portion of the map data 116 and/or the sensor data 119 can be located in one or more data stores 115 that are located remotely from the vehicle 102.

As noted above, the vehicle 102 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 102 (including any of the elements shown in FIG. 1). The sensor system 120 can acquire data of at least a portion of the internal environment as well as the external environment of the vehicle 102 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 102. In one or more arrangements, the vehicle sensor(s) 121 can include a speedometer to determine a current speed of the vehicle 102.

Alternatively, or in addition, the sensor system 120 can include one or more environment sensors 122 configured to acquire, and/or sense data inside the vehicle as well as around the vehicle. Sensor data inside the vehicle can include information about one or more users in the vehicle cabin and any other objects of interest. Sensor data around the vehicle can include information about the external environment in which the vehicle is located or one or more portions thereof.

As an example, the one or more environment sensors 122 can be configured to detect, quantify and/or sense objects in at least a portion of the internal and/or the external environment of the vehicle 102 and/or information/data about such objects.

In the internal environment of the vehicle 102, the one or more environment sensors 122 can be configured to detect, measure, quantify, and/or sense human users inside the vehicle 102 and the facial expressions of the users. In the external environment, the one or more environment sensors 122 can be configured to detect, measure, quantify, and/or sense objects in the external environment of the vehicle 102, such as, for example, lane markers, signs, traffic lights, traffic signs, lane lines, crosswalks, curbs proximate the vehicle 102, off-road objects, electronic roadside devices, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126, and/or one or more audio sensors 127. In one or more arrangements, the one or more cameras 126 can be high dynamic range (HDR) cameras or infrared (IR) cameras. The audio sensor(s) 127 can be microphones and/or any suitable audio recording devices. Any sensor in the sensor system 120 that is suitable for detecting and observing humans and/or human facial expression can be used inside the vehicle 102 to observe the users. Additionally, the sensor system 120 can include one or more air quality sensors 128 for detecting allergens such as pollen, dust, and/or fur in the air inside the vehicle. The sensor system 120 can include one or more light sensors 129 for measuring light levels inside the vehicle.

The vehicle 102 can include an input system 130. An "input system" includes any device, component, system, element or arrangement or groups thereof that enable information/data to be entered into a machine. The input system 130 can receive an input from a user (e.g., a driver or a passenger). The vehicle 102 can include an output system 135. An "output system" includes any device, component, or arrangement or groups thereof that enable information/data to be presented to a user (e.g., a person, a vehicle passenger, etc.) such as a display interface.

The vehicle 102 can include one or more vehicle systems 140. Various examples of the one or more vehicle systems 140 are shown in FIG. 1. However, the vehicle 102 can include more, fewer, or different vehicle systems 140. It should be appreciated that although particular vehicle systems are separately defined, each or any of the systems or portions thereof may be otherwise combined or segregated via hardware and/or software within the vehicle 102. The vehicle 102 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 102 and/or to determine a travel route for the vehicle 102. The navigation system 147 can include one or more mapping applications to determine a travel route for the vehicle 102. The navigation system 147 can include a global positioning system, a local positioning system or a geolocation system.

The vehicle 102 can include one or more autonomous driving systems 160. The autonomous driving system 160 can include one or more devices, applications, and/or combinations thereof, now known or later developed, configured to control the movement, speed, maneuvering, heading, direction, etc. of the vehicle 102. The autonomous driving system 160 can include one or more driver assistance systems such as a lane keeping system, a lane centering system, a collision avoidance system, and/or a driver monitoring system.

The autonomous driving system(s) 160 can be configured to receive data from the sensor system 120 and/or any other type of system capable of capturing information relating to the vehicle 102 and/or the external environment of the vehicle 102. In one or more arrangements, the autonomous driving system(s) 160 can use such data to generate one or more driving scene models. The autonomous driving system(s) 160 can determine position and velocity of the vehicle 102. The autonomous driving system(s) 160 can determine the location of obstacles, obstacles, or other environmental features including traffic signs, trees, shrubs, neighboring vehicles, pedestrians, etc.

The autonomous driving system(s) 160 can be configured to receive, and/or determine location information for obstacles within the external environment of the vehicle 102 for use by the processor(s) 110, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving system(s) 160 either independently or in combination with the model prediction control system 100 can be configured to determine travel path(s), current autonomous driving maneuvers for the vehicle 102, future autonomous driving maneuvers and/or modifications to current autonomous driving maneuvers based on data acquired by the sensor system 120, driving scene models, data from any other suitable source such as determinations from the sensor data 119, and/or realization delays associated with the current and/or future autonomous driving maneuver(s). "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving system(s) 160 can be configured to implement determined driving maneuvers. The autonomous driving system(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system(s) 160 can be configured to execute various vehicle functions and/or to transmit data to, receive data from, interact with, and/or control the vehicle 102 or one or more systems thereof (e.g., one or more of vehicle systems 140).

The processor(s) 110, the model prediction control system 100, and/or the autonomous driving system(s) 160 can be operatively connected to communicate with the various vehicle systems 140 and/or individual components thereof. For example, returning to FIG. 1, the processor(s) 110, the model prediction control system 100, and/or the autonomous driving system(s) 160 can be in communication to send and/or receive information from the various vehicle systems 140 to control the movement, speed, maneuvering, heading, direction, etc. of the vehicle 102. The processor(s) 110, the model prediction control system 100, and/or the autonomous driving system(s) 160 may control some or all of these vehicle systems 140 and, thus, may be partially or fully autonomous.

The processor(s) 110, the model prediction control system 100, and/or the autonomous driving system(s) 160 may be operable to control the navigation and/or maneuvering of the vehicle 102 by controlling one or more of the vehicle systems 140 and/or components thereof. As an example, when operating in an autonomous mode, the processor(s) 110, the model prediction control system 100, and/or the autonomous driving system(s) 160 can control the direction and/or speed of the vehicle 102. As another example, the processor(s) 110, the model prediction control system 100, and/or the autonomous driving system(s) 160 can activate, deactivate, and/or adjust the parameters (or settings) of the one or more driver assistance systems. The processor(s) 110, the model prediction control system 100, and/or the autonomous driving system(s) 160 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor 110, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor;
   a memory storing machine-readable instructions that, when executed by the processor, cause the processor to:
      determine a first realization delay associated with a first control command based on the first control command, a current vehicle condition, a future vehicle condition, a current environment condition, and a future environment condition;
      determine a second realization delay associated with a second control command based on the second control command, the current vehicle condition, the future vehicle condition, the current environment condition, and the future environment condition, the second control command being received by the processor after the first control command is received by the processor, the first control command being at least one of a steering command, a braking command, or a throttle command and the second control command being at least one of the steering command, the braking command, or the throttle command; and
      transmit the first control command to a vehicle system associated with the first control command at an issue time that is based on the first realization delay and the second realization delay.

2. The system of claim 1, wherein the first realization delay is indicative of a first time difference estimate between when the first control command is received by the processor and when the first control command is performed by the vehicle system associated with the first control command; and
   wherein the second realization delay is indicative of a second time difference estimate between when the second control command is received by the processor and when the second control command is performed by a vehicle system associated with the second control command.

3. The system of claim 1, wherein the first control command is performed by at least one of a steering system, a braking system, or a throttle system and the second control command is performed by at least one of the steering system, the braking system, or the throttle system.

4. The system of claim 1, wherein the first control command includes a type of command and at least one parameter, and wherein the machine-readable instructions further include machine-readable instructions that when executed by the processor cause the processor to:
- determine at least one of the type of command or the at least one parameter based on the first realization delay.

5. The system of claim 1, wherein the first control command includes a type of command and at least one parameter, and wherein the machine-readable instructions further include machine-readable instructions that when executed by the processor cause the processor to:
- determine at least one of the type of command or the at least one parameter based on at least one of the first realization delay, the second realization delay, or the second control command.

6. The system of claim 1, further comprising:
- generating the first realization delay and the second realization delay using an online dynamic model and based on one or more previous realization delays in the vehicle.

7. A method comprising:
- determining a first realization delay associated with a first control command based on the first control command, a current vehicle condition, a future vehicle condition, a current environment condition, and a future environment condition;
- determining a second realization delay associated with a second control command based on the second control command, the current vehicle condition, the future vehicle condition, the current environment condition, and the future environment condition, the second control command being received by a processor after the first control command is received by the processor, the first control command being at least one of a steering command, a braking command, or a throttle command and the second control command being at least one of the steering command, the braking command, or the throttle command; and
- transmitting the first control command to a vehicle system associated with the first control command at an issue time that is based on the first realization delay and the second realization delay.

8. The method of claim 7, wherein the first realization delay is indicative of a first time difference estimate between when the first control command is received by the processor and when the first control command is performed by the vehicle system associated with the first control command; and
- wherein the second realization delay is indicative of a second time difference estimate between when the second control command is received by the processor and when the second control command is performed by a vehicle system associated with the second control command.

9. The method of claim 7, wherein the first control command is performed by at least one of a steering system, a braking system, or a throttle system and the second control command is performed by at least one of the steering system, the braking system, or the throttle system.

10. The method of claim 7, wherein the first control command includes a type of command and at least one parameter, further comprising:
- determining at least one of the type of command or the at least one parameter based on the first realization delay.

11. The method of claim 7, wherein the first control command includes a type of command and at least one parameter, further comprising:
- determining at least one of the type of command or the at least one parameter based on at least one of the first realization delay, the second realization delay, or the second control command.

12. The method of claim 7, further comprising:
- generating the first realization delay and the second realization delay using an online dynamic model and based on one or more previous realization delays in the vehicle.

13. A non-transitory computer-readable medium including instructions that when executed by a processor cause the processor to:
- determine a first realization delay associated with a first control command based on the first control command, a current vehicle condition, a future vehicle condition, a current environment condition, and a future environment condition;
- determine a second realization delay associated with a second control command based on the second control command, the current vehicle condition, the future vehicle condition, the current environment condition, and the future environment condition, the second control command being received by the processor after the first control command is received by the processor, the first control command is at least one of a steering command, a braking command, or a throttle command and the second control command is at least one of the steering command, the braking command, or the throttle command; and
- transmit the first control command to a vehicle system associated with the first control command at an issue time that is based on the first realization delay and the second realization delay.

14. The non-transitory computer-readable medium of claim 13, wherein the first realization delay is indicative of a first time difference estimate between when the first control command is received by the processor and when the first control command is performed by the vehicle system associated with the first control command; and
- wherein the second realization delay is indicative of a second time difference estimate between when the second control command is received by the processor and when the second control command is performed by a vehicle system associated with the first control command.

15. The non-transitory computer-readable medium of claim 13, wherein the first control command is performed by at least one of a steering system, a braking system, or a throttle system and the second control command is performed by at least one of the steering system, the braking system, or the throttle system.

16. The non-transitory computer-readable medium of claim 13, wherein the first control command includes a type of command and at least one parameter, and wherein the instructions further include instructions that when executed by the processor cause the processor to:
- determine at least one of the type of command or the at least one parameter based on the first realization delay.

17. The non-transitory computer-readable medium of claim 13, wherein the first control command includes a type of command and at least one parameter, and wherein the instructions further include instructions that when executed by the processor cause the processor to:
- determine at least one of the type of command or the at least one parameter based on at least one of the first realization delay, the second realization delay, or the second control command.

* * * * *